(12) United States Patent
Wu et al.

(10) Patent No.: US 10,685,185 B2
(45) Date of Patent: Jun. 16, 2020

(54) KEYWORD RECOMMENDATION METHOD AND SYSTEM BASED ON LATENT DIRICHLET ALLOCATION MODEL

(71) Applicant: GUANGZHOU SHENMA MOBILE INFORMATION TECHNOLOGY CO., LTD., Guangzhou (CN)

(72) Inventors: Jingtong Wu, Guangzhou (CN); Tianning Li, Guangzhou (CN)

(73) Assignee: Guangzhou Shenma Mobile Information Technology Co., Ltd., Guangzhou (CN)

( * ) Notice: Subject to any disclaimer, the term of this patent is extended or adjusted under 35 U.S.C. 154(b) by 179 days.

(21) Appl. No.: 16/019,278

(22) Filed: Jun. 26, 2018

(65) Prior Publication Data
US 2018/0307680 A1 Oct. 25, 2018

Related U.S. Application Data

(63) Continuation of application No. PCT/CN2016/106114, filed on Nov. 16, 2016.

(30) Foreign Application Priority Data

Dec. 29, 2015 (CN) .......................... 2015 1 1024348

(51) Int. Cl.
*G06F 40/30* (2020.01)
*G06N 20/00* (2019.01)
(Continued)

(52) U.S. Cl.
CPC .............. *G06F 40/30* (2020.01); *G06F 16/00* (2019.01); *G06F 16/3346* (2019.01);
(Continued)

(58) Field of Classification Search
USPC ........................................................ 704/7–10
See application file for complete search history.

(56) References Cited

U.S. PATENT DOCUMENTS

| 7,606,790 B2 | 10/2009 | Levy |
| 7,809,704 B2 | 10/2010 | Surendran et al. |

(Continued)

FOREIGN PATENT DOCUMENTS

| CN | 1460947 A | 12/2003 |
| CN | 102411638 A | 4/2012 |

(Continued)

OTHER PUBLICATIONS

International Search Report and Written Opinion for Application No. PCT/CN2016/106114, dated Feb. 20, 2017, 13 pages.

(Continued)

*Primary Examiner* — Leonard Saint Cyr
(74) *Attorney, Agent, or Firm* — Sheppard Mullin Richter & Hampton LLP

(57) ABSTRACT

Keyword recommendation methods and systems based on a latent Dirichlet allocation (LDA) model. The method comprises: calculating a basic Dirichlet allocation model for training texts; obtaining an incremental seed word, and selecting from the training texts a training text matching the incremental seed word to serve as an incremental training text; calculating an incremental Dirichlet allocation model for the incremental training text; obtaining a probability distribution of complete words to topics and a probability distribution of complete texts to topics; calculating a relevance score between the complete word and any other complete word respectively to obtain a relevance score between every two complete words; and determining, according to an obtained query word and the obtained relevance score between every two complete words, a keyword corresponding to the query word. By employing an (Continued)

incremental training model, the present invention greatly improves the precision of topic clustering and topic diversity, and significantly improves the quality of keywords in the topics.

20 Claims, 5 Drawing Sheets

(51) Int. Cl.
| | | |
|---|---|---|
| *G06F 16/33* | (2019.01) | |
| *G06F 16/00* | (2019.01) | |
| *G06F 40/242* | (2020.01) | |
| *G06N 5/04* | (2006.01) | |
| *G06N 7/00* | (2006.01) | |

(52) U.S. Cl.
CPC ........ *G06F 16/3347* (2019.01); *G06F 40/242* (2020.01); *G06N 5/04* (2013.01); *G06N 7/005* (2013.01); *G06N 20/00* (2019.01)

(56) References Cited

U.S. PATENT DOCUMENTS

| | | | |
|---|---|---|---|
| 7,849,291 | B2 | 12/2010 | Hansen et al. |
| 8,024,344 | B2 | 9/2011 | Bradford |
| 8,326,777 | B2 | 12/2012 | Zhang et al. |
| 8,442,972 | B2 | 5/2013 | Ismalon |
| 8,583,648 | B1 | 11/2013 | Majkowska |
| 8,886,639 | B2 | 11/2014 | Puterman-Sobe et al. |
| 8,898,172 | B2 | 11/2014 | Liu et al. |
| 9,195,758 | B2 | 11/2015 | Parikh et al. |
| 9,275,129 | B2 | 3/2016 | Desai et al. |
| 9,519,858 | B2 | 12/2016 | Zweig et al. |
| 10,176,260 | B2 | 1/2019 | Mahapatra et al. |
| 2008/0005137 | A1 | 1/2008 | Surendran et al. |
| 2012/0078979 | A1 | 3/2012 | Ghimire |
| 2012/0209847 | A1 | 8/2012 | Rangan |
| 2012/0221562 | A1 | 8/2012 | Zhang et al. |
| 2014/0365209 | A1 | 12/2014 | Evermann |

FOREIGN PATENT DOCUMENTS

| | | |
|---|---|---|
| CN | 104750856 A | 7/2015 |
| CN | 104850617 A | 8/2015 |
| CN | 104933100 A | 9/2015 |
| CN | 104933183 A | 9/2015 |
| CN | 104965889 A | 10/2015 |
| CN | 105677769 A | 6/2016 |

OTHER PUBLICATIONS

PCT International Preliminary Report on Patentability dated Jul. 12, 2018, issued in related International Application No. PCT/CN2016/106114 (16 pages).
First Office Action dated Sep. 29, 2016, issued in related Chinese Application No. 201511024348.5 (11 pages).
Second Office Action dated Jan. 17, 2017, issued in related Chinese Application No. 201511024348.5 (8 pages).
Third Office Action dated May 8, 2017, issued in related Chinese Application No. 201511024348.5 (10 pages).
Fourth Office Action dated Aug. 15, 2017, issued in related Chinese Application No. 201511024348.5 (7 pages).
Notification to Grant Patent Right for Invention dated Oct. 27, 2017, issued in related Chinese Application No. 201511024348.5 (3 pages).

KEYWORD RECOMMENDATION METHOD AND SYSTEM BASED ON LATENT DIRICHLET ALLOCATION MODEL

CROSS REFERENCE TO RELATED APPLICATIONS

The present application a continuation application of International Patent Application No. PCT/CN2016/106114, filed on Nov. 16, 2016, which is based on and claims priority to and benefits of Chinese Patent Application No. CN201511024348.5 filed with the China Patent Office on Dec. 29, 2015 and entitled "Keyword Recommendation Method and System Based on Latent Dirichlet Allocation (LDA) Model," which is incorporated herein by reference in its entirety.

TECHNICAL FIELD

The present invention relates to artificial intelligence technologies, and in particular, to keyword recommendation methods and systems based on a latent Dirichlet allocation (LDA) model.

BACKGROUND

Use of recommendations in search engines is a trend of search engine development. A need for recommendations is particularly important in a wireless search scenario, because the cost for a user to obtain information can be higher on a relatively small screen in a wireless search scenario. The user expects that a machine could better understand the demand of the user and provide recommendations of similar query information while satisfying a current search query. Therefore, it is particularly important with regard to the involvement of a recommendation in a search.

In existing search engines, there are roughly two types of scenario where recommendations are used. One type is that some personalized recommendations are provided to a user on a homepage according to analysis of historical behaviors of the user, thereby achieving an effect of obtaining without searching. For example, a user has paid more attention to a certain vehicle recently, searched many queries related to this vehicle, and browsed many websites related to this vehicle. By analyzing the user's behaviors, it can be concluded that the user is interested in the vehicle, and the latest news and videos on the same type can be recommended. The other type is that recommendation contents are provided to a user while the user is searching an exemplary query. For example, when a user is searching Magotan used cars, relevant queries are provided, such as quotes for Magotan used cars, minor issues regarding repair of Magotan used cars, and the like.

The above-mentioned two types of recommendations both involve a key technology, i.e., establishment of association of relevant words, which can also be interpreted as relevant word clustering. For example, auto repair, used car, and Magotan used cars can be clustered into one class. Alternatively, it can be understood that auto repair has a close relationship with used cars, while auto repair does not have a more distant relationship with other non-auto related words.

The inventors of the present invention have realized that existing keyword relevance recommendation technologies can have some issues. For example, it is impossible to provide keyword recommendations that are more pertinent for more refined texts in an industry. As an example, keyword recommendations of sports-related topics can be accurately obtained, but it would be more difficult to obtain keyword recommendations for race cars, a secondary classification of sports.

SUMMARY

One object of the present invention is to provide a novel technical solution for recommendations.

According to one aspect of the present invention, a keyword recommendation method based on an LDA model is provided, and the method comprises: calculating a basic Dirichlet allocation model for training texts, and obtaining a probability distribution of basic words to topics and a probability distribution of basic texts to topics; obtaining an incremental seed word, and screening the training texts to select a training text matching the incremental seed word to serve as an incremental training text; calculating an incremental Dirichlet allocation model for the incremental training text, and obtaining a probability distribution of incremental words to topics and a probability distribution of incremental texts to topics; adding the probability distribution of incremental words to topics to the probability distribution of basic words to topics, and adding the probability distribution of incremental texts to topics to the probability distribution of basic texts to topics, thereby obtaining a probability distribution of complete words to topics and a probability distribution of complete texts to topics; calculating a relevance score between the complete word and any other complete word respectively to obtain a relevance score between every two complete words; and determining, according to an obtained query word and the obtained relevance score between every two complete words, a keyword corresponding to the query word.

According to one embodiment, the method further comprises pre-processing the training texts for structured storage and to generate a plaintext dictionary.

According to another embodiment, when a basic Dirichlet allocation model is calculated for the training text or an incremental Dirichlet allocation model is calculated for the incremental training text, the Gibbs sampling or variational method is used to perform sampling and spot sampling on the text.

The step of calculating a basic Dirichlet allocation model for the training text, in one embodiment, comprises: S11. Dividing the training text into a plurality of sets; S12. Calculating a basic Dirichlet allocation model for each set of the training text, respectively, and obtaining a probability distribution of basic words to topics and a probability distribution of basic texts to topics of the set; S13. Synchronizing the probability distributions of basic words to topics and the probability distributions of basic texts to topics for all sets; S14. Determining whether the basic Dirichlet allocation model reaches a number of iterations, and if not, continuing to calculate the basic Dirichlet allocation model of each set on the basis of the synchronized data; if yes, outputting the synchronized probability distribution of basic words to topics and the synchronized probability distribution of basic texts to topics.

The step of obtaining an incremental seed word, in one embodiment, comprises: obtaining a preset seed word; obtaining an expanded seed word from the preset seed word according to a preset rule; and using the preset seed word and the expanded seed word as the incremental seed word.

The obtaining an expanded seed word from the preset seed word according to a preset rule, in one step, comprises: obtaining an expanded candidate set according to the preset seed word and a text deep learning model; using one word in the expanded candidate set as a to-be-processed word, calculating a distance weight between the to-be-processed word and each preset seed word, respectively, and using a sum of the distance weights between the to-be-processed word and all the preset seed words as a final confidence level; if the final confidence level is greater than a particular threshold, using the to-be-processed word as an expanded seed word, and using a next word in the expanded candidate set as the to-be-processed word until all words in the expanded candidate set have been processed.

According to another aspect of the present invention, a keyword recommendation system based on an LDA model is provided, and the system comprises: a basic training module configured to calculate a basic Dirichlet allocation model for training texts, and obtain a probability distribution of basic words to topics and a probability distribution of basic texts to topics; an incremental screening module configured to obtain an incremental seed word, and screen the training texts to select a training text matching the incremental seed word to serve as an incremental training text; an incremental training module configured to calculate an incremental Dirichlet allocation model for the incremental training text, and obtain a probability distribution of incremental words to topics and a probability distribution of incremental texts to topics; a complete calculating module configured to add the probability distribution of incremental words to topics to the probability distribution of basic words to topics, and add the probability distribution of incremental texts to topics to the probability distribution of basic texts to topics, thereby obtaining a probability distribution of complete words to topics and a probability distribution of complete texts to topics; a relevance calculating module configured to calculate a relevance score between the complete word and any other complete word respectively to obtain a relevance score between every two complete words; and a keyword recommendation module configured to determine, according to an obtained query word and the obtained relevance score between every two complete words, a keyword corresponding to the query word.

According to one embodiment, the system further comprises a text pre-processing module configured to pre-process the training texts for structured storage and to generate a plaintext dictionary.

According to another embodiment, the relevance calculating module is configured to obtain complete topic word vectors from the probability distributions of complete words to topics, select a complete topic word vector as a to-be-processed topic vector, use every two complete words in the to-be-processed topic vector as a to-be-processed phrase, calculate a relevance weight of the to-be-processed phrase in each complete topic word vector, respectively, use a sum of the relevance weights of the to-be-processed phrase in all complete topic word vectors as a relevance score of the to-be-processed phrase, use a next complete topic word vector as the to-be-processed topic vector, and repeat the above steps until relevance scores of all to-be-processed phrases are obtained through calculation.

The basic training module or the incremental training module, in one embodiment, is configured to use the Gibbs sampling or variational method to perform sampling and spot sampling on the text.

The basic training module further, according to one embodiment, comprises: a text dividing sub-module configured to divide the training text into a plurality of sets; a basic training sub-module configured to calculate a basic Dirichlet allocation model for each set of the training text, respectively, and obtain a probability distribution of basic words to topics and a probability distribution of basic texts to topics of the set; a synchronizing sub-module configured to synchronize the probability distributions of basic words to topics and the probability distributions of basic texts to topics for all sets; and a determining sub-module configured to determine whether the basic Dirichlet allocation model reaches a number of iterations, and if not, continue to calculate the basic Dirichlet allocation model of each set on the basis of the synchronized data; if yes, output the synchronized probability distribution of basic words to topics and the synchronized probability distribution of basic texts to topics.

The incremental screening module further, according to one embodiment, comprises: a first obtaining sub-module configured to obtain a preset seed word, an expanding module configured to obtain an expanded seed word from the preset seed word according to a preset rule, and a generating module configured to use the preset seed word and the expanded seed word as the incremental seed word.

The expanding module, according to one embodiment, is configured to generate an expanded candidate set according to the preset seed word and a text deep learning model; use one word in the expanded candidate set as a to-be-processed word, calculate a distance weight between the to-be-processed word and each preset seed word, respectively, and use a sum of the distance weights between the to-be-processed word and all the preset seed words as a final confidence level; if the final confidence level is greater than a particular threshold, use the to-be-processed word as an expanded seed word, and use a next word in the expanded candidate set as the to-be-processed word until all words in the expanded candidate set have been processed.

The present disclosure further provides a keyword recommendation system based on an LDA model. The system includes one or more processors and a memory storing instructions that, when executed by the one or more processors, cause the system to: calculate a basic LDA model for training texts, and obtain a probability distribution of basic words to topics and a probability distribution of basic texts to topics, obtain an incremental seed word, and screen the training texts to select a training text matching the incremental seed word to serve as an incremental training text, calculate an incremental LDA model for the incremental training text, and obtain a probability distribution of incremental words to topics and a probability distribution of incremental texts to topics, add the probability distribution of incremental words to topics to the probability distribution of basic words to topics, and add the probability distribution of incremental texts to topics to the probability distribution of basic texts to topics, thereby obtaining a probability distribution of complete words to topics and a probability distribution of complete texts to topics, calculate a relevance score between the complete word and any other complete word respectively to obtain a relevance score between every two complete words, and determine, according to an obtained query word and the obtained relevance score between every two complete words, a keyword corresponding to the query word.

The present disclosure further provides a computer readable medium storing instructions, that, when executed by a computer, cause the computer to perform a method comprising calculating a basic LDA model for training texts, and obtaining a probability distribution of basic words to topics and a probability distribution of basic texts to topics, obtaining an incremental seed word, and screening the training texts to select a training text matching the incremental seed word to serve as an incremental training text, calculating an incremental LDA model for the incremental training text, and obtaining a probability distribution of incremental words to topics and a probability distribution of incremental texts to topics, adding the probability distribution of incremental words to topics to the probability distribution of basic words to topics, and adding the probability distribution of incremental texts to topics to the probability distribution of basic texts to topics, thereby obtaining a probability distribution of complete words to topics and a probability distribution of complete texts to topics, calculating a relevance score between the complete word and any other complete word respectively to obtain a relevance score between every two complete words, and determining, according to an obtained query word and the obtained relevance score between every two complete words, a keyword corresponding to the query word.

By innovatively employing an incremental training model, the keyword recommendation methods and systems according to the present invention greatly improve the precision of topic clustering and topic diversity, significantly improve the quality of keywords in the topics, establish association between the keywords, and lay a foundation for keyword recommendation. At the same time, the keyword recommendation methods and systems according to the present invention can be applied on a variety of online projects.

Those skilled in the art should understand that, despite of many problems present in the current technologies, the technical solution of each embodiment or claim of the present invention can make improvements one or several aspects, and there is no need to simultaneously solve all technical problems listed in the current technologies or in the Background. Those skilled in the art should understand that content not mentioned in a claim shall not be used as a limitation to the claim.

Other features and advantages of the present invention will become clear with reference to the detailed description of exemplary embodiments of the present invention below.

BRIEF DESCRIPTION OF THE DRAWINGS

Embodiments of the present invention are illustrated with reference to the accompanying drawings that are incorporated in the description and become a part of the description, and the accompanying drawings and their description are used together to describe the principles of the present invention.

DETAILED DESCRIPTION

Various exemplary embodiments of the present disclosure will be described in detail with reference to the accompanying drawings. It should be noted that relative arrangements of parts and steps, numeric expressions and values in these embodiments do not limit the scope of the present invention, unless otherwise specified.

The following description of at least one exemplary embodiment is in fact illustrative only and may never be used as any limitation to the present disclosure or an application or use of the present disclosure.

It is possible that technologies, methods and devices known to those skilled in the art are not discussed in detail. In a proper situation, however, the technologies, methods and devices shall be deemed a part of the description.

In all examples illustrated and discussed herein, any particular value shall be interpreted as being illustrative only, rather than restrictive. Therefore, other examples of the exemplary embodiments may have different values.

It should be noted that similar numbers and letters represent similar items in the accompanying drawings. Therefore, once an item is defined in one figure, it is not necessary to further discuss the item in the following figures.

Figure 1:
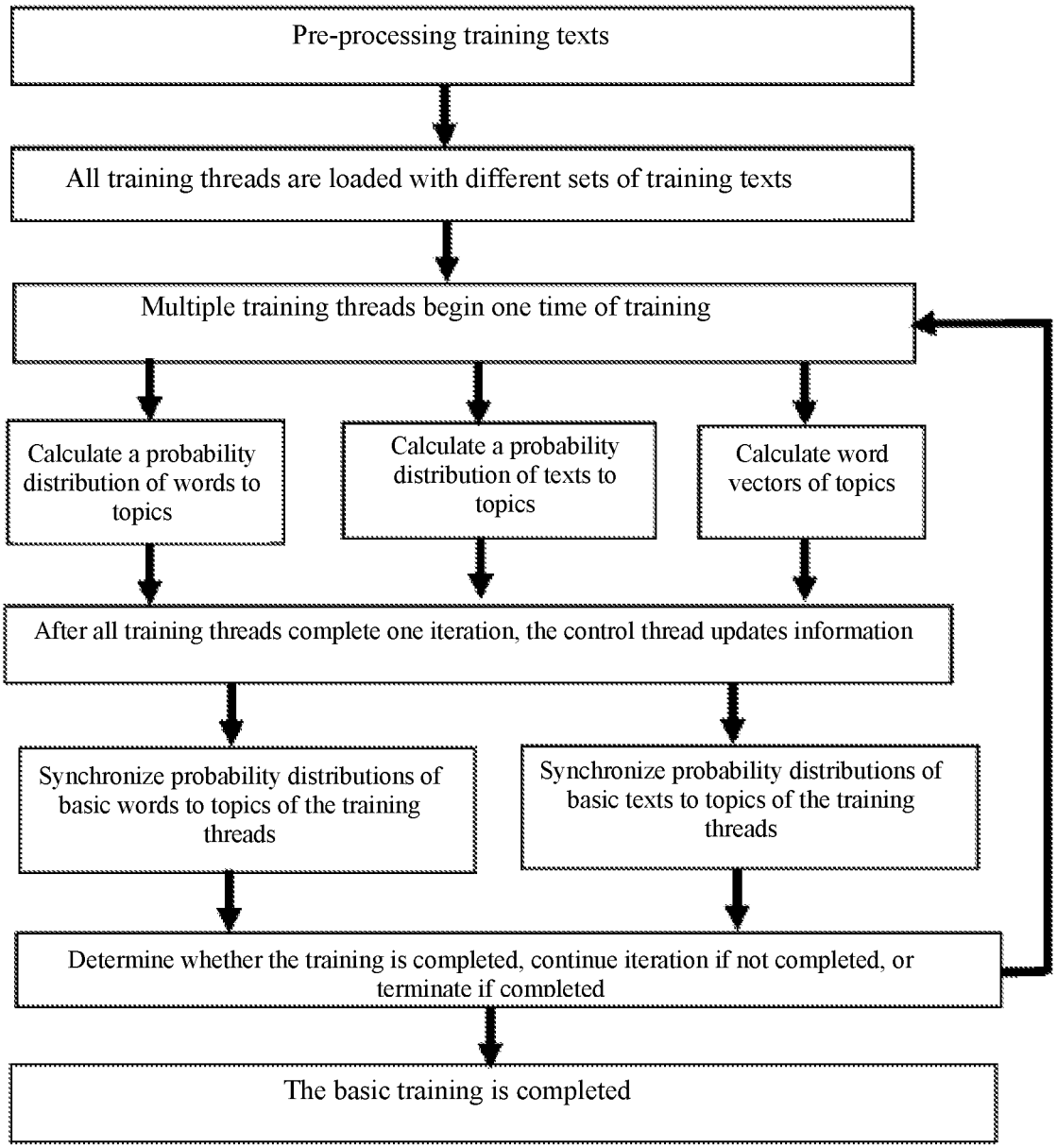
FIG. 1 is a schematic diagram of a principle of a calculation method for a basic Dirichlet allocation model according to a first embodiment of the present invention.

A keyword recommendation method based on an LDA model according to a first embodiment of the present invention comprises basic Dirichlet allocation training and incremental Dirichlet allocation training. As shown in FIG. 1, the method comprises the following steps: first, the system obtains training texts, pre-processes the training texts for structured storage and generates a plaintext dictionary. Structured storage and plaintext dictionary are common pre-processing methods for texts, according to which an article is first subject to segmentation, then common words are filtered out using a dictionary of common words, and characteristic words useful in the article are extracted. For example, noise characteristic words having no practical meaning in an article, such as "Die," "Di" and "De," are filtered out. A plaintext dictionary means that a word is plaintext itself, but a very large storage space is needed if all words in all articles are saved during a training process. It is necessary to convert the plaintext into a signature and save the signature. Therefore, it is necessary to use a plaintext dictionary to record a signature corresponding to a plaintext word. For example, after a sentence "a race car competition of Schumacher" is pre-processed for structured storage, "Di" is removed, and characteristic words, including "Schumacher," "race car," and "competition," are retained. If the words of Schumacher, race car, and competition are directly stored, the storage load is too high for a memory to handle. Therefore, a plaintext dictionary is generated with "Schumacher" corresponding to 001, "race car" corresponding to 002, and "competition" corresponding to 003. During an LDA training process, 001, 002, and 003, instead of plain texts, are used to reduce the pressure on a memory.

Subsequently, a basic LDA model is calculated for training texts to obtain a probability distribution of basic words to topics and a probability distribution of basic texts to topics. It should be noted that the calculation of an LDA model can be conducted with an existing or known calculation method in the art, as long as it can be applied in the present invention. The calculation of a basic LDA model can be conducted in a variety of manners. For example, LDA models of all training texts can be calculated with one single training thread of a processor. Preferably, the calculation can be conducted with multiple processors and multiple training threads. Alternatively, distributed calculation can be conducted.

In one embodiment, multiple training threads are used to calculate a basic LDA model, and a control thread is used to control the multiple training threads. For example, the training text is first divided into a plurality of sets. Different training text sets are loaded to a plurality of training threads for iterative calculation. Each thread performs iteration processing on the corresponding training text set to calculate a basic LDA model, respectively, and to obtain a probability distribution of basic words to topics and a probability distribution of basic texts to topics of the set. Here, a training thread can use, for example, the Gibbs sampling or variational method to perform sampling and spot sampling on the text. The probability distribution of basic words to topics is a matrix of words to topics with the rows of the matrix being words and the columns of the matrix being topics of implicit calculation. The probability distribution of basic texts to topics is a matrix of texts to topics with the rows of the matrix being training texts and the columns of the matrix being topics of implicit calculation. A word vector of a topic is a column vector of a matrix of words to topics. These matrixes initially have random values, and each value of the matrix is gradually calculated and optimized through Gibbs sampling and iteration. Ultimately, word clustering can be obtained through the matrix of words to topics to guide keyword recommendation. After one iteration, the control thread synchronizes the probability distributions of basic words to topics and the probability distributions of basic texts to topics for all sets, and determines whether the basic LDA model reaches a number of iterations. If not, the control thread sends the synchronized data to the training threads, and the training threads continue to calculate the basic LDA model of each set. If yes, the control thread outputs the synchronized probability distribution of basic words to topics and the synchronized probability distribution of basic texts to topics.

Figure 2:
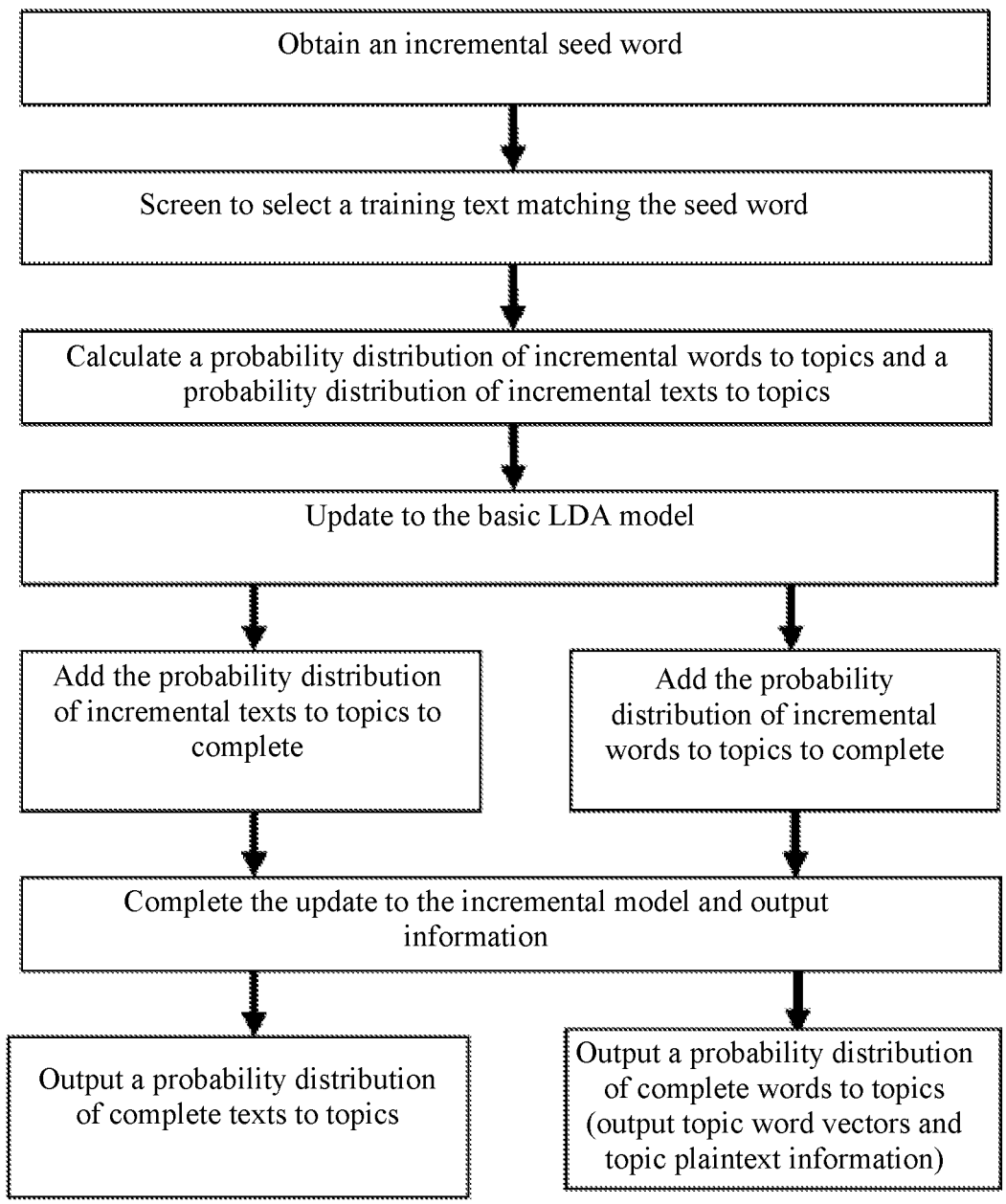
FIG. 2 is a schematic diagram of a principle of a calculation method for an incremental Dirichlet allocation model according to the first embodiment of the present invention.

Word clusters are obtained after the basic LDA training. To further solve the problem of covering long-tail topics, however, an incremental LDA training is introduced in some embodiments of the present invention after the basic LDA training. The incremental LDA training uses seed words in some sub-sectors to generate corresponding topics in a pertinent manner, as shown in FIG. 2.

In the incremental LDA training, an incremental seed word is obtained first, and the training texts are screened to select a training text matching the incremental seed word to serve as an incremental training text.

The seed word can be selected through manual screening, and the manually screened and selected seed word can be used as the incremental seed word. Alternatively, the manually screened and selected seed word can be used as a preset seed word, and an expanded seed word can be obtained from the preset seed word according to a preset rule. The preset seed word and the expanded seed word can be used as the incremental seed word.

For example, several seed words are manually selected as preset seed words in the beginning, and an expanded candidate set is obtained according to the preset seed words and a text deep learning model, wherein the text deep learning model can be a word2Vec model.

According to one embodiment, the step of obtaining the incremental seed word comprises the following steps:

using industry representative seed words that are manually labeled as preset seed words, the industry representative seed words being determined according to various industries;

obtaining an expanded candidate set with regard to the industry representative seed words from a corpus of the industry using the word2Vec method;

calculating a distance weight between words in the expanded candidate set and each seed word, respectively, using the word2Vec method, obtaining a final confidence level of an expanded word by adding the distance weights, and adding expanded words with the final confidence level greater than a particular threshold into the expanded seed word set. The preset seed words and the expanded seed words can be used as the incremental seed words. The particular threshold can be obtained according to data distribution and statistics of various industries.

Subsequently, a training text matching the incremental seed word is selected through screening to serve as an incremental training text. The matching process includes fuzzy matching. Texts comprising more seed words are more likely to be selected, while it is also possible for a text without seed words to be selected.

An incremental LDA model is calculated for the incremental training text selected through screening to obtain a probability distribution of incremental words to topics and a probability distribution of incremental texts to topics. The manner in which the probability distribution of incremental words to topics and the probability distribution of incremental texts to topics are obtained is similar to the basic LDA training. Namely, a training thread can use, for example, the Gibbs sampling or variational method to perform sampling and spot sampling on a text. Moreover, iteration calculation similar to the basic LDA training can be performed, then the training thread can synchronize the probability distributions of incremental words to topics and the probability distributions of incremental texts to topics for all sets and determine whether the incremental LDA model reaches a number of iterations. If not, the control thread sends the synchronized data to the training threads, and the training threads continue to calculate the incremental LDA model of each set. If yes, the control thread outputs the synchronized probability distribution of incremental words to topics and the synchronized probability distribution of incremental texts to topics.

Then, the probability distribution of incremental words to topics is added to the probability distribution of basic words to topics, and the probability distribution of incremental texts to topics is added to the probability distribution of basic texts to topics, thereby obtaining a probability distribution of complete words to topics and a probability distribution of complete texts to topics.

As such, after information update, the incremental model outputs an updated probability distribution of documents to topics and plaintext information of the topics. Results that impact keywords are relatively related to training texts. Since the incremental model uses texts that are relatively refined in an industry, the topic granularity of calculation would be better. For example, a topic model regarding sports can be obtained from the basic model, and a word vector of a topic with a secondary granularity, such as race car, can be further obtained through the incremental LDA model. The word vector of a topic is a column vector in a probability distribution of words to topics, a series of related words, and weights of the words corresponding to the topic. For example, a word vector of a car topic consists of [Benz 0.08, BMW 0.06, Tesla 0.04, Tiguan 0.04, Land Rover 0.02 . . . ], and the weight that Benz belongs to this topic is 0.08.

After the probability distribution of complete words to topics and the probability distribution of complete texts to topics are obtained, it is necessary to calculate a relevance weight and a relevance score between the words. Complete topic word vectors are obtained from the probability distributions of complete words to topics, i.e. the column vectors in the probability distribution of words to topics. Then, a relevance weight simi($a1$, $a2$) between every two words ($a1$, $a2$) in the topic is calculated for each topic word vector i. N clustered topic word vectors can be obtained through training with the basic LDA model and the incremental LDA model, and in each topic word vector, the weight of the word a1 or the word a2 in a topic can be obtained. With the percent of a1 and a2 in the weight of all words in a topic, the relevance weight between a1 and a2 can be calculated, as shown in the equation 1

$$simi(a1,a2)=a1+a2/\text{sum}(a1,a2 \ldots an) \quad \text{(Equation 1)}$$

where a1 is a weight of the word a1 in a topic, and similarly a2 is a weight of the word a2 in the same topic.

Then, relevance weights of the two words (a1, a2) in all topic word vectors are added linearly to obtain Σsimi(a1, a2), thereby obtaining the final relevance weight between these two words sim(a1, a2), as shown in the equation 2.

$$sim(a1,a2)=sim1+sim2 \ldots +simN; \quad \text{(Equation 2)}$$

Lastly, a keyword corresponding to an obtained query word is determined according to the query word and the obtained relevance score between every two complete words.

Preferably, one or more complete words having the highest final relevance score with the query word are recommended as keywords.

Figure 3:
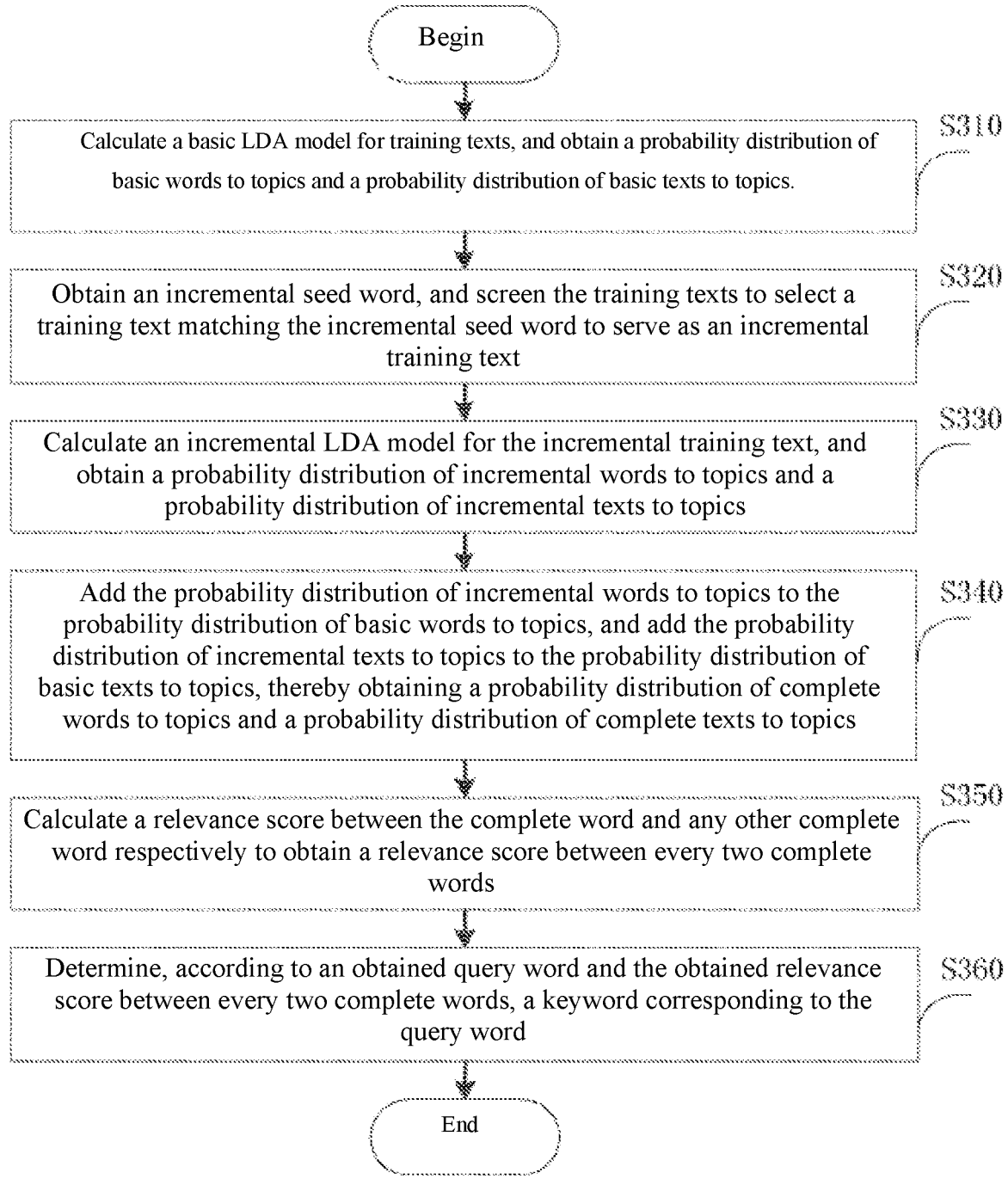
FIG. 3 is a flow chart of a keyword recommendation method based on an LDA model according to a second embodiment of the present invention.

FIG. 3 is a flow chart of a keyword recommendation method based on an LDA model according to a second embodiment of the present invention.

Step S310. Calculate a basic LDA model for training texts, and obtain a probability distribution of basic words to topics and a probability distribution of basic texts to topics.

In an implementation manner, steps of calculating a basic LDA model for training texts are as follows:

Step 1: Divide the training text into a plurality of sets.

Step 2: Calculate a basic LDA model for each set of the training text, respectively, and obtain a probability distribution of basic words to topics and a probability distribution of basic texts to topics of the set.

Step 3: Synchronize the probability distributions of basic words to topics and the probability distributions of basic texts to topics for all sets.

Step 4: Determine whether the basic LDA model reaches a number of iterations, and if not, continue to calculate the basic LDA model of each set on the basis of the synchronized data; if yes, output the synchronized probability distribution of basic words to topics and the synchronized probability distribution of basic texts to topics.

Step S320. Obtain an incremental seed word, and screen the training texts to select a training text matching the incremental seed word to serve as an incremental training text.

In an implementation manner, steps of obtaining an incremental seed word are as follows:

Step 1: Obtain a preset seed word.

Step 2: Obtain an expanded seed word from the preset seed word according to a preset rule.

An implementation manner of Step 2 can be carried out with the following steps:

obtaining an expanded candidate set according to the preset seed word and a text deep learning model; and using one word in the expanded candidate set as a to-be-processed word, calculating a distance weight between the to-be-processed word and each preset seed word, respectively, and using a sum of the distance weights between the to-be-processed word and all the preset seed words as a final confidence level; if the final confidence level is greater than a particular threshold, using the to-be-processed word as an expanded seed word, and using a next word in the expanded candidate set as the to-be-processed word until all words in the expanded candidate set have been processed.

Step 3: Use the preset seed word and the expanded seed word as the incremental seed word.

Step S330. Calculate an incremental LDA model for the incremental training text, and obtain a probability distribution of incremental words to topics and a probability distribution of incremental texts to topics.

In an implementation manner, when a basic Dirichlet allocation model is calculated for the training text or an incremental Dirichlet allocation model is calculated for the incremental training text, the Gibbs sampling or variational method is used to perform sampling and spot sampling on the text.

Step S340. Add the probability distribution of incremental words to topics to the probability distribution of basic words to topics, and add the probability distribution of incremental texts to topics to the probability distribution of basic texts to topics, thereby obtaining a probability distribution of complete words to topics and a probability distribution of complete texts to topics.

Step S350. Calculate a relevance score between the complete word and any other complete word respectively to obtain a relevance score between every two complete words.

In an implementation manner, Step S350 may comprise: obtaining complete topic word vectors from the probability distributions of complete words to topics, selecting a complete topic word vector as a to-be-processed topic vector, using every two complete words in the to-be-processed topic vector as a to-be-processed phrase, calculating a relevance weight of the to-be-processed phrase in each complete topic word vector, respectively, using a sum of the relevance weights of the to-be-processed phrase in all complete topic word vectors as a relevance score of the to-be-processed phrase, using a next complete topic word vector as the to-be-processed topic vector, and repeating the above steps until relevance scores of all to-be-processed phrases are obtained through calculation.

Step S360. Determine, according to an obtained query word and the obtained relevance score between every two complete words, a keyword corresponding to the query word.

Furthermore, the method may further comprise: preprocessing the training texts for structured storage and to generate a plaintext dictionary.

Figure 4:
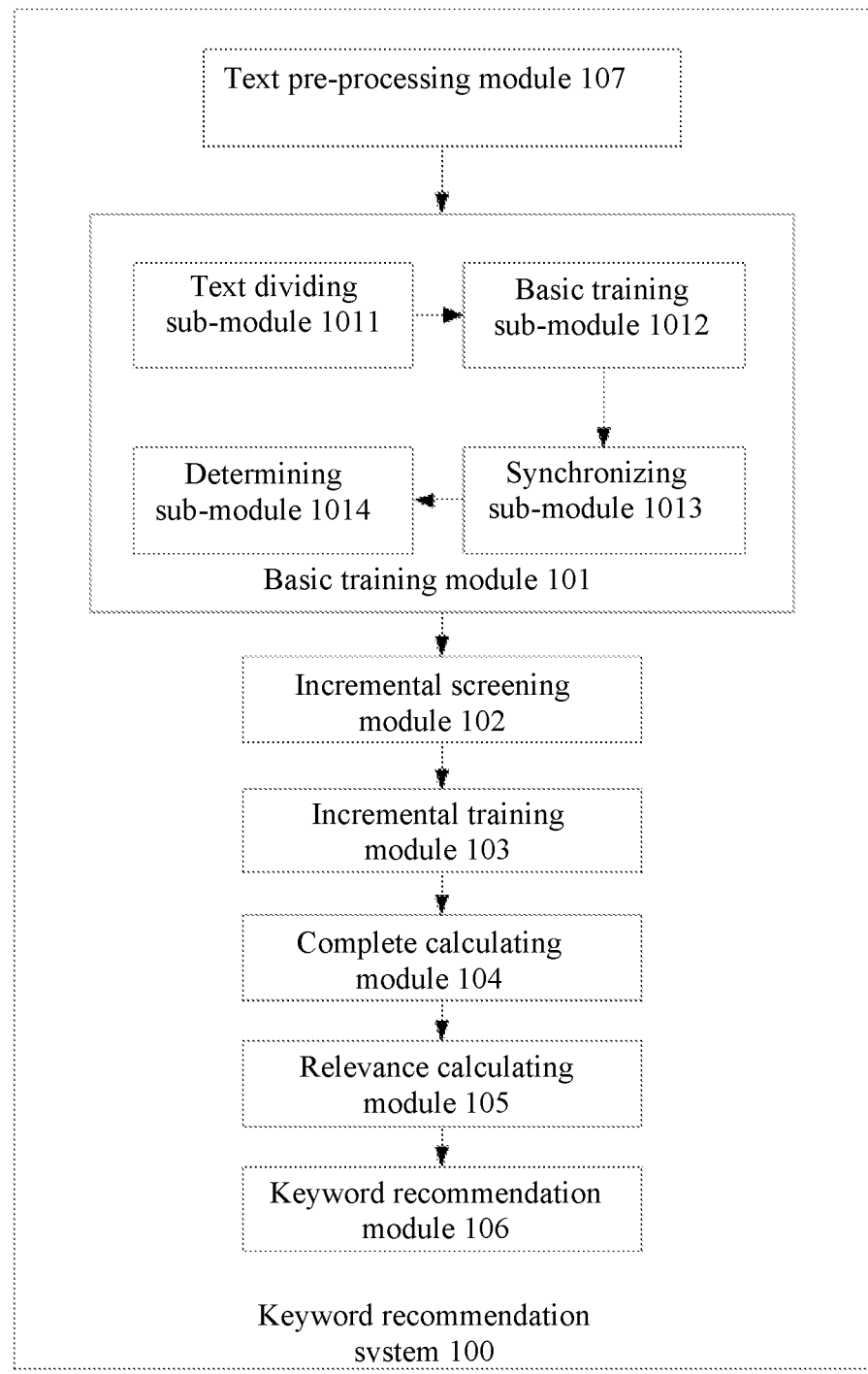
FIG. 4 is a block diagram of a keyword recommendation system according to a third embodiment of the present invention.

In addition, FIG. 4 illustrates a keyword recommendation system according to a third embodiment of the present invention. Portions of the present embodiment that are the same as or similar to the first embodiment will not be repeated below. The system is configured to execute all steps in the keyword recommendation method according to the first embodiment of the present invention, and the system is arranged on a computer device. The computer device comprises a processor, a display, a memory, and other peripherals.

Figure 5:
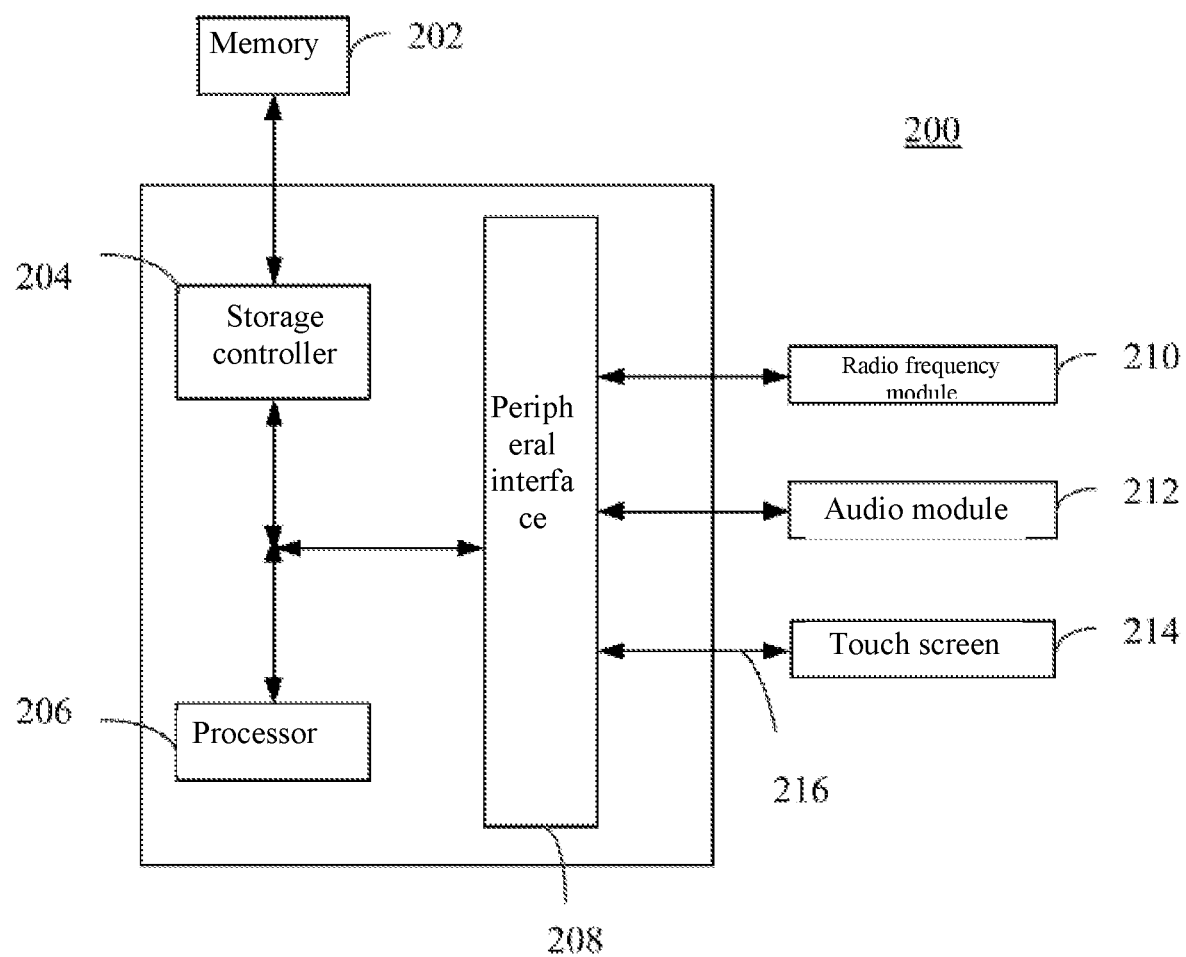
FIG. 5 is a structural block diagram of a computer device according to a fourth embodiment of the present invention.

Furthermore, FIG. 5 is a structural block diagram of a computer device according to a fourth embodiment of the present invention. As shown in FIG. 5, the computer device 200 comprises a memory 202, a storage controller 204, one or more (only one shown in the figure) processors 206, a peripheral interface 208, a radio frequency module 210, an audio module 212, and a touch screen 214. These components communicate with one another via one or more communication buses/signal lines 216.

The memory 202 can be used to store software programs and modules, such as programs instructions/modules corresponding to the keyword recommendation method and apparatus in some embodiments of the present invention. By running the software programs and modules stored in the memory 202, the processor 206 executes various functional applications and data processing, such as the method for downloading files in some embodiments of the present invention.

The memory 202 may comprise a high-speed random access memory and can further comprise a non-volatile memory, such as one or more magnetic storage apparatuses, flash memory or other non-volatile solid-state memory. Access to the memory 202 by the processor 206 and other possible components can be performed under the control of the storage controller 204.

The peripheral interface 208 couples a variety of input/output apparatuses to the processor 206 and the memory 202. In some embodiments, the peripheral interface 208, the processor 206, and the storage controller 204 can be implemented in a single chip. In some other embodiments, they can be implemented by separate chips, respectively.

The radio frequency module 210 can be used to receive and transmit electromagnetic waves and achieve mutual conversion between electromagnetic waves and electric signals, thereby communicating with a communication network or other devices.

The audio module 212 provides an audio interface for a user and can comprise one or more microphones, one or more loudspeakers, and an audio circuit.

The touch screen 214 provides an output interface and an input interface between the computer device 200 and a user. For example, the touch screen 214 displays a video output to a user, and the content of the video output can comprise texts, images, videos, and any combination thereof.

It should be understood that the structure shown in FIG. 4 is merely exemplary. The computer device 200 can comprise more or fewer components than those shown in FIG. 4, or may have a configuration different from what is shown in FIG. 4. All components shown in FIG. 4 can be implemented with hardware, software, or a combination thereof.

The keyword recommendation system based on an LDA model comprises: a text pre-processing module 106 configured to pre-process training texts for structured storage and to generate a plaintext dictionary; a basic training module 101 configured to calculate a basic LDA model for the training texts, and obtain a probability distribution of basic words to topics and a probability distribution of basic texts to topics; an incremental screening module 102 configured to obtain an incremental seed word, and screen the training texts to select a training text matching the incremental seed word to serve as an incremental training text; an incremental training module 103 configured to calculate an incremental LDA model for the incremental training text, and obtain a probability distribution of incremental words to topics and a probability distribution of incremental texts to topics; a complete calculating module 104 configured to add the probability distribution of incremental words to topics to the probability distribution of basic words to topics, and add the probability distribution of incremental texts to topics to the probability distribution of basic texts to topics, thereby obtaining a probability distribution of complete words to topics and a probability distribution of complete texts to topics; a relevance calculating module 105 configured to calculate a relevance score between the complete word and any other complete word respectively to obtain a relevance score between every two complete words; and a keyword recommendation module 106 configured to determine, according to an obtained query word and the obtained relevance score between every two complete words, a keyword corresponding to the query word.

Here, the basic training module 101 may further comprise: a text dividing sub-module 1011 configured to divide the training text into a plurality of sets; a basic training sub-module 1012 configured to calculate a basic LDA model for each set of the training text, respectively, and obtain a probability distribution of basic words to topics and a probability distribution of basic texts to topics of the set; a synchronizing sub-module 1013 configured to synchronize the probability distributions of basic words to topics and the probability distributions of basic texts to topics for all sets; and a determining sub-module 1014 configured to determine whether the basic LDA model reaches a number of iterations, and if not, continue to calculate the basic LDA model of each set on the basis of the synchronized data; if yes, output the synchronized probability distribution of basic words to topics and the synchronized probability distribution of basic texts to topics.

By innovatively employing an incremental training model, the keyword recommendation methods and systems according to the present invention greatly improve the precision of topic clustering and topic diversity, significantly improve the quality of keywords in the topics, establish association between the keywords, and lay a foundation for keyword recommendation. At the same time, the keyword recommendation methods and systems according to the present invention can be applied on a variety of online projects, such as optimization based on people recommendation, creation of user labels, and homepage recommendations.

With the keyword recommendation methods and systems according to the present invention, recommendations for related queries when a user is searching Magotan used cars are, for example, quotes for Magotan used cars, repair of Magotan used cars, and the like. It can be seen in the constructed topics that used car, Magotan, quote, and auto repair can all be clustered into one topic. By calculating weights of relevance between these words, relevance of these words can be clearly obtained, which is higher than that of other non-auto words. Related query sets can be constructed with regard to queries on Magotan used cars, such as quotes for Magotan used cars, repair issues of Magotan used cars, and the like. When a user is searching one query, therefore, some similar queries can be recommended.

The keyword recommendation methods and systems according to the present invention can also be applied in a process to create a user label. In a conventional collaborative filtering recommendation method, the first step is to find similar users, i.e., user searching for similar contents. This is when a keyword recommendation technology is needed for establishing association between users. For example, one user searches Benz, and the other user searches BMW. If only keyword matching is used, it would be difficult to know that both users look for luxury cars. Through a keyword recommendation technology, however, it can be concluded that the two words, Benz and BMW, have relatively high relevance, thereby establishing association between these two users.

Those skilled in the art should understand that the system 100 can be implemented in a variety of manners. For example, the units and modules can be implemented by configuring a processor with instructions. For example, the instructions can be stored in ROM. When the device is turned on, the instructions can be read from ROM to a programmable device to implement the units and modules.

For example, the units and modules can be fixed into a dedicated device (e.g., ASIC). A unit can be divided into mutually independent units, or units can be integrated in implementation. The units can be implemented in one of the above various implementation manners, or they can be implemented in a combination of two or more of the above various implementation manners.

The methods and systems according to the present invention can be embodied through program products. The program products can comprise a computer readable medium having non-volatile program codes that are executable by a processor, and the computer readable medium is loaded with readable program instructions that enable a processor to implement all aspects of the present invention.

The computer readable medium having non-volatile program codes that are executable by a processor can be a tangible device capable of retaining and storing instructions that are used by an instruction executing device. For example, the readable storage medium can be, but is not limited to, an electric storage device, a magnetic storage device, an optical storage device, an electromagnetic storage device, a semiconductor storage device, or any proper combination of the above devices. Examples of the readable storage medium (a non-exhaustive list) comprise: a portable disk, hard disk, Random Access Memory (RAM), Read-Only Memory (ROM), Erasable Programmable Read-Only Memory (EPROM or flash memory), Static RAM (SRAM), Compact Disk Read-Only Memory (CD-ROM), Digital Versatile Disc (DVD), memory stick, floppy disk, mechanical coding device, such as a punch card stored with instructions or a protruding structure inside a groove, and any proper combination of the above. The readable storage medium used herein may not be interpreted as a transient signal itself, such as radio waves, other freely propagating electromagnetic waves, electromagnetic waves propagating via a waveguide or other transmission media (e.g., an optical pulse via a fiber optic cable), or electric signals transmitted via a wire.

The readable program instructions described herein can be downloaded from the non-volatile computer readable medium to electronic devices or can be downloaded to an external electronic device or an external storage device via a network, e.g., the Internet, a local area network, a wide area network, and/or a wireless network. The network can comprise copper transmission cables, fiber optic transmission, wireless transmission, routers, firewalls, switches, gateway computers, and/or edge servers. A network adapter card or network interface in each electronic device can receive readable program instructions from the network and forward the readable program instructions for storage in a readable storage medium in each computing/processing device.

A program instruction for executing operations of the present invention can be an assembled instruction, an Instruction Set Architecture (ISA) instruction, a machine instruction, a machine-related instruction, a micro-code, a firmware instruction, state setting data, or source code or target code compiled in any combination of one or more programming languages. The programming languages comprise object-oriented programming languages, such as Smalltalk, C++, and the like, as well as conventional procedural programming languages, such as C or similar programming languages. The readable program instructions can be fully executed on a user's electronic device, partially executed on a user's electronic device, executed as an independent software package, partially executed on a user's electronic device and partially executed on a remote computer, or fully executed on a remote computer or server. In a situation involving a remote computer, the remote computer can be connected to a user's electronic device via any type of network, including local area network (LAN) or wide area network (WAN), or the remote computer can be connected to an external computer (e.g., connecting via the Internet by using an Internet service provider). In some embodiments, state information of the readable program instructions can be used to personalize a custom electronic circuit, such as a programmable logic circuit, a field-programmable gate array (FPGA) or a programmable logic array (PLA). The electronic circuit can execute computer readable program instructions, thereby implementing all aspects of the present invention.

All aspects of the present invention are described here with reference to flow charts and/or block diagrams of the methods and apparatuses of embodiments of the present invention. It should be understood that every block of the flow charts and/or block diagrams and a combination of blocks of the flow charts and/or block diagrams can be implemented by readable program instructions.

These readable program instructions can be provided to a processor of an electronic device, thereby producing a machine and causing these instructions to, when executed by the processor of the electronic device, produce an apparatus implementing functions/actions specified in one or more blocks in the flow charts and/or block diagrams. These readable program instructions can also be stored in a readable storage medium. These instructions enable an electronic device to work in a particular manner. Therefore, the readable medium stored with instructions comprises a manufactured article that includes an instruction for implementing all aspects of functions/actions specified in one or more blocks in the flow charts and/or block diagrams.

The readable program instructions can also be loaded onto an electronic device, causing a series of operating steps to be executed on the electronic device to produce a process of instruction implementation, thereby enabling instructions executed on the electronic device to implement functions/actions specified in one or more blocks in the flow charts and/or block diagrams.

The flow charts and block diagrams in the accompanying drawings illustrate system architectures, functions and operations of apparatuses and methods according to a plurality of embodiments of the present invention. With regard to this point, every block in the flow charts or block diagrams can represent a part of a module, program segment or instruction. The part of module, program segment or instruction comprises one or more executable instructions for implementing prescribed logic functions. In some alternative implementations, functions labeled in the blocks can also take place in an order different from the one labeled in the accompanying drawings. For example, two consecutive blocks can actually be executed substantially in parallel, or they can be sometimes executed in an opposite order, which depends on the involved functions. It should also be noted that every block of the flow charts and/or block diagrams and a combination of blocks of the flow charts and/or block diagrams can be implemented by a dedicated hardware-based system for executing prescribed functions or actions or by a combination of dedicated hardware and instructions. It is known to those skilled in the art that implementation in a hardware manner, implementation in a software manner, and implementation in a manner of combined software and hardware are equivalent.

The embodiments of the present invention have been described above. The description above is exemplary, rather than exhaustive, and is not limited to the disclosed embodiments. It would be obvious to those skilled in the art that many amendments and variations can be made without departing from the scope and spirit of the described embodiments. The terms herein are selected to explain principles, practical applications or technical improvements of the embodiments to the technologies on the market in an optimal manner, or to enable those skilled in the art to understand the embodiments disclosed herein. The scope of the present invention shall be subject to the appended claims.

What is claimed is:

1. A keyword recommendation method based on a latent Dirichlet allocation (LDA) model, comprising:
   calculating a basic latent Dirichlet allocation (LDA) model for training texts, and obtaining a probability distribution of basic words to topics and a probability distribution of basic texts to topics;
   obtaining an incremental seed word, and screening the training texts to select a training text matching the incremental seed word to serve as an incremental training text;
   calculating an incremental LDA model for the incremental training text, and obtaining a probability distribution of incremental words to topics and a probability distribution of incremental texts to topics;
   adding the probability distribution of incremental words to topics to the probability distribution of basic words to topics, and adding the probability distribution of incremental texts to topics to the probability distribution of basic texts to topics, thereby obtaining a probability distribution of complete words to topics and a probability distribution of complete texts to topics;
   calculating a relevance score between the complete word and any other complete word respectively to obtain a relevance score between every two complete words; and
   determining, according to an obtained query word and the obtained relevance score between every two complete words, a keyword corresponding to the query word.

2. The method according to claim 1, wherein the calculating a relevance score between the complete word and any other complete word respectively comprises:
   obtaining complete topic word vectors from the probability distributions of complete words to topics, selecting a complete topic word vector as a to-be-processed topic vector, using every two complete words in the to-be-processed topic vector as a to-be-processed phrase, calculating a relevance weight of the to-be-processed phrase in each complete topic word vector, respectively, using a sum of the relevance weights of the to-be-processed phrase in all complete topic word vectors as a relevance score of the to-be-processed phrase, using a next complete topic word vector as the to-be-processed topic vector, and repeating the above steps until relevance scores of all to-be-processed phrases are obtained through calculation.

3. The method according to claim 1, wherein the method further comprises:
   pre-processing the training texts for structured storage and to generate a plaintext dictionary.

4. The method according to claim 1, wherein, when a basic Dirichlet allocation model is calculated for the training text or an incremental Dirichlet allocation model is calculated for the incremental training text, the Gibbs sampling or variational method is used to perform sampling and spot sampling on the text.

5. The method according to claim 1, wherein the step of calculating a basic LDA model for the training text comprises:
   dividing the training text into a plurality of sets;
   calculating a basic LDA model for each set of the training text, respectively, and obtaining a probability distribution of basic words to topics and a probability distribution of basic texts to topics of the set;
   synchronizing the probability distributions of basic words to topics and the probability distributions of basic texts to topics for all sets; and
   determining whether the basic LDA model reaches a number of iterations, and if not, continuing to calculate the basic LDA model of each set on the basis of the synchronized data; if yes, outputting the synchronized probability distribution of basic words to topics and the synchronized probability distribution of basic texts to topics.

6. The method according to claim 1, wherein the step of obtaining an incremental seed word comprises:
   obtaining a preset seed word;
   obtaining an expanded seed word from the preset seed word according to a preset rule; and
   using the preset seed word and the expanded seed word as the incremental seed word.

7. The method according to claim 6, wherein the obtaining an expanded seed word from the preset seed word according to a preset rule comprises:
   obtaining an expanded candidate set according to the preset seed word and a text deep learning model;
   using one word in the expanded candidate set as a to-be-processed word, calculating a distance weight between the to-be-processed word and each preset seed word, respectively, and using a sum of the distance weights between the to-be-processed word and all the preset seed words as a final confidence level; if the final confidence level is greater than a particular threshold, using the to-be-processed word as an expanded seed word, and using a next word in the expanded candidate set as the to-be-processed word until all words in the expanded candidate set have been processed.

8. A keyword recommendation system based on latent Dirichlet allocation (LDA) model, comprising:
   one or more processors; and
   a memory storing instructions that, when executed by the one or more processors, cause the system to:
   calculate a basic latent Dirichlet allocation (LDA) model for training texts, and obtain a probability distribution of basic words to topics and a probability distribution of basic texts to topics;
   obtain an incremental seed word, and screen the training texts to select a training text matching the incremental seed word to serve as an incremental training text;
   calculate an incremental LDA model for the incremental training text, and obtain a probability distribution of incremental words to topics and a probability distribution of incremental texts to topics;
   add the probability distribution of incremental words to topics to the probability distribution of basic words to topics, and add the probability distribution of incremental texts to topics to the probability distribution of basic texts to topics, thereby obtaining a probability distribution of complete words to topics and a probability distribution of complete texts to topics;

calculate a relevance score between the complete word and any other complete word respectively to obtain a relevance score between every two complete words; and determine, according to an obtained query word and the obtained relevance score between every two complete words, a keyword corresponding to the query word.

9. The keyword recommendation system according to claim 8, wherein, calculate a relevance score between the complete word and any other complete word respectively to obtain a relevance score between every two complete words, the memory storing instructions that, when executed by the one or more processors, cause the system to: obtain complete topic word vectors from the probability distributions of complete words to topics, select a complete topic word vector as a to-be-processed topic vector, use every two complete words in the to-be-processed topic vector as a to-be-processed phrase, calculate a relevance weight of the to-be-processed phrase in each complete topic word vector, respectively, use a sum of the relevance weights of the to-be-processed phrase in all complete topic word vectors as a relevance score of the to-be-processed phrase, use a next complete topic word vector as the to-be-processed topic vector, and repeat the above steps until relevance scores of all to-be-processed phrases are obtained through calculation.

10. The keyword recommendation system according to claim 8, wherein the memory storing instructions that, when executed by the one or more processors, cause the system to: pre-process the training texts for structured storage and to generate a plaintext dictionary.

11. The keyword recommendation system according to claim 8, wherein the memory storing instructions that, when executed by the one or more processors, cause the system to: use the Gibbs sampling or variational method to perform sampling and spot sampling on the text.

12. The keyword recommendation system according to claim 8, wherein, calculate a basic LDA model for training texts, the memory storing instructions that, when executed by the one or more processors, cause the system to: divide the training text into a plurality of sets;

calculate a basic LDA model for each set of the training text, respectively, and obtain a probability distribution of basic words to topics and a probability distribution of basic texts to topics of the set;

synchronize the probability distributions of basic words to topics and the probability distributions of basic texts to topics for all sets; and determine whether the basic LDA model reaches a number of iterations, and if not, continue to calculate the basic LDA model of each set on the basis of the synchronized data; if yes, output the synchronized probability distribution of basic words to topics and the synchronized probability distribution of basic texts to topics.

13. The keyword recommendation system according to claim 8, wherein, obtain an incremental seed word, the memory storing instructions that, when executed by the one or more processors, cause the system to:

obtain a preset seed word;
obtain an expanded seed word from the preset seed word according to a preset rule; and
use the preset seed word and the expanded seed word as the incremental seed word.

14. The keyword recommendation system according to claim 13, wherein, obtain an expanded seed word from the preset seed word according to a preset rule, the memory storing instructions that, when executed by the one or more processors, cause the system to: generate an expanded candidate set according to the preset seed word and a text deep learning model; use one word in the expanded candidate set as a to-be-processed word, calculate a distance weight between the to-be-processed word and each preset seed word, respectively, and use a sum of the distance weights between the to-be-processed word and all the preset seed words as a final confidence level; if the final confidence level is greater than a particular threshold, use the to-be-processed word as an expanded seed word, and use a next word in the expanded candidate set as the to-be-processed word until all words in the expanded candidate set have been processed.

15. A non-transitory computer readable medium storing instructions, that, when executed by a computer, cause the computer to perform a method comprising:

calculating a basic latent Dirichlet allocation (LDA) model for training texts, and obtaining a probability distribution of basic words to topics and a probability distribution of basic texts to topics;

obtaining an incremental seed word, and screening the training texts to select a training text matching the incremental seed word to serve as an incremental training text;

calculating an incremental LDA model for the incremental training text, and obtaining a probability distribution of incremental words to topics and a probability distribution of incremental texts to topics;

adding the probability distribution of incremental words to topics to the probability distribution of basic words to topics, and adding the probability distribution of incremental texts to topics to the probability distribution of basic texts to topics, thereby obtaining a probability distribution of complete words to topics and a probability distribution of complete texts to topics;

calculating a relevance score between the complete word and any other complete word respectively to obtain a relevance score between every two complete words; and determining, according to an obtained query word and the obtained relevance score between every two complete words, a keyword corresponding to the query word.

16. The computer readable medium of claim 15, wherein the calculating a relevance score between the complete word and any other complete word respectively comprises:

obtaining complete topic word vectors from the probability distributions of complete words to topics, selecting a complete topic word vector as a to-be-processed topic vector, using every two complete words in the to-be-processed topic vector as a to-be-processed phrase, calculating a relevance weight of the to-be-processed phrase in each complete topic word vector, respectively, using a sum of the relevance weights of the to-be-processed phrase in all complete topic word vectors as a relevance score of the to-be-processed phrase, using a next complete topic word vector as the to-be-processed topic vector, and repeating the above steps until relevance scores of all to-be-processed phrases are obtained through calculation.

17. The computer readable medium of claim 15, wherein the method further comprises:

pre-processing the training texts for structured storage and to generate a plaintext dictionary.

18. The computer readable medium of claim 15, wherein, when a basic Dirichlet allocation model is calculated for the training text or an incremental Dirichlet allocation model is calculated for the incremental training text, the Gibbs sampling or variational method is used to perform sampling and spot sampling on the text.

19. The computer readable medium of claim 15, wherein the step of calculating a basic LDA model for the training text comprises:
- dividing the training text into a plurality of sets;
- calculating a basic LDA model for each set of the training text, respectively, and obtaining a probability distribution of basic words to topics and a probability distribution of basic texts to topics of the set;
- synchronizing the probability distributions of basic words to topics and the probability distributions of basic texts to topics for all sets; and
- determining whether the basic LDA model reaches a number of iterations, and if not, continuing to calculate the basic LDA model of each set on the basis of the synchronized data; if yes, outputting the synchronized probability distribution of basic words to topics and the synchronized probability distribution of basic texts to topics.

20. The computer readable medium of claim 15, wherein the step of obtaining an incremental seed word comprises:
- obtaining a preset seed word;
- obtaining an expanded seed word from the preset seed word according to a preset rule; and
- using the preset seed word and the expanded seed word as the incremental seed word.

* * * * *